United States Patent [19]

Flynn

[11] 4,053,397
[45] Oct. 11, 1977

[54] METHOD OF RECOVERING BACKWASH LIQUID WITH EXHAUSTED RESIN

[75] Inventor: George C. Flynn, Somerville, N.J.

[73] Assignee: Ecodyne Corporation, Lincolnshire, Ill.

[21] Appl. No.: 665,457

[22] Filed: Mar. 10, 1976

Related U.S. Application Data

[63] Continuation of Ser. No. 535,563, Dec. 23, 1974, abandoned.

[51] Int. Cl.² ............................................. B01D 15/00
[52] U.S. Cl. ...................................................... 210/34
[58] Field of Search ................. 210/33, 34, 189, 37 R, 210/38 C

[56] References Cited

U.S. PATENT DOCUMENTS 3,250,703  5/1966  Levenclusky .......................... 210/37
3,862,032  1/1975  Dixon .................................... 210/189

Primary Examiner—Thomas G. Wyse
Assistant Examiner—Ernest G. Therkorn
Attorney, Agent, or Firm—David A. Anderson

[57] ABSTRACT

A method for recovering and reusing liquid used to backwash a precoated filter in which the backwash liquid used in a previous backwashing cycle is passed through a filter that is about to be backwashed. The used backwash liquid is treated by the remaining capacity in the filter precoat, and is then used to backwash the filter. This backwash liquid is recovered for later treatment and use in another backwashing cycle.

9 Claims, 1 Drawing Figure

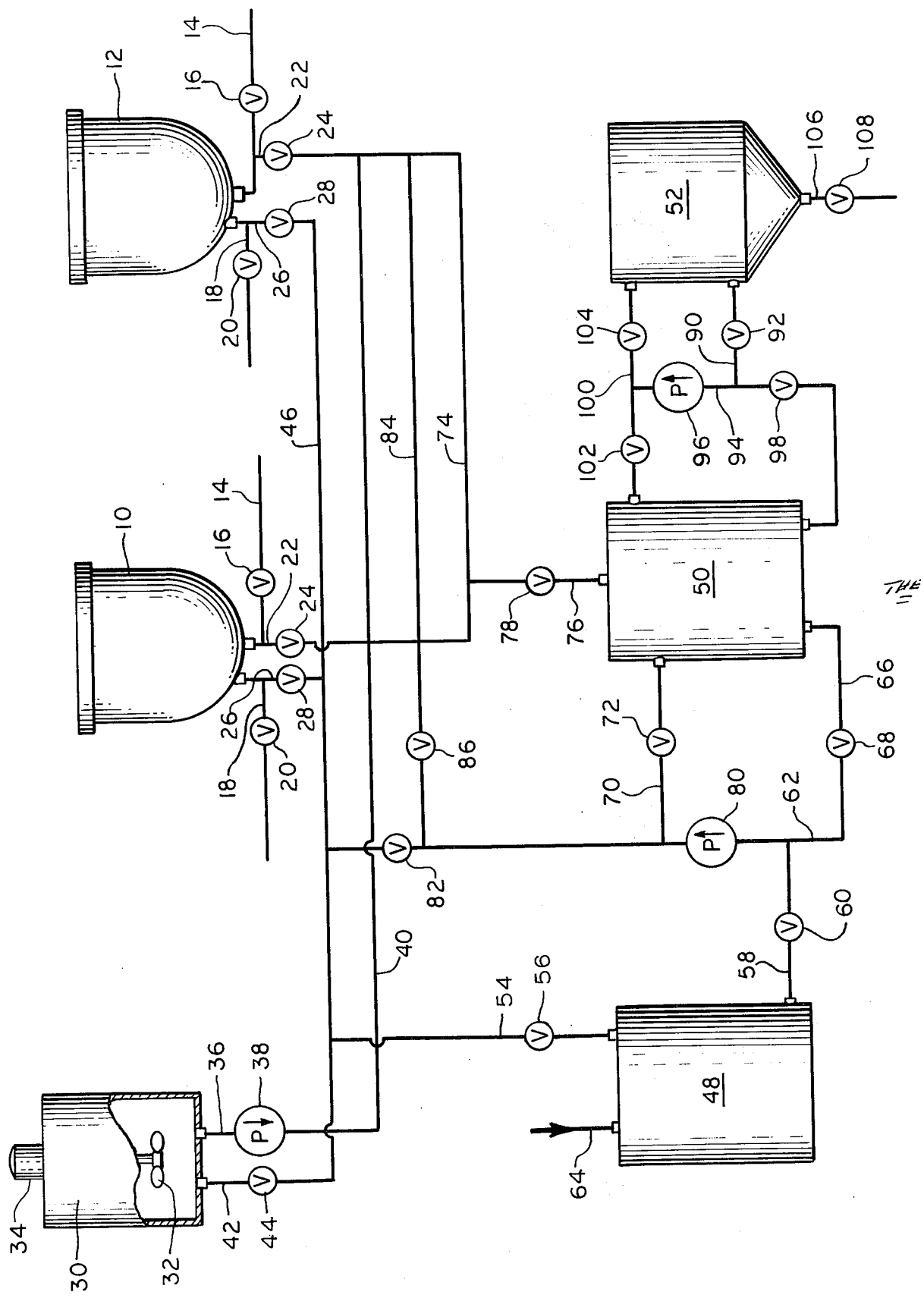

METHOD OF RECOVERING BACKWASH LIQUID WITH EXHAUSTED RESIN

This is a continuation of application Ser. No. 535,563, filed Dec. 23, 1974 now abandoned.

The present invention relates to an improved method for repeatedly recovering and reusing liquid used to backwash a precoated filter.

Precoated filters are well known in the art, and have a variety of uses in the liquid purification field. Where the precoated filter is used for the removal of undissolved solids, conventional filter aid materials may be employed as the precoat, such as diatomaceous earth, regenerated cellulose, expanded perlite, and the like. If it is also desired to remove dissolved solids, the precoat comprises finely divided ion exchange resin particles, preferably in the size range of 60 to 400 mesh. These ion exchange resin particles usually comprise a mixture of anion and cation exchange resin particles, which exhibit the phenomenon of "clumping," reducing the pressure drop across these particles, and increasing the efficiency of undissolved solids removal. Because of this high efficiency in undissolved solids removal, finely divided ion exchange resins are frequently employed for undissolved solids removal, even where the removal of dissolved solids is of little or no importance. In addition, ion exchange resins are sometimes used in combination with additional precoat layers of the aforementioned conventional filter aid materials, or such filter aid materials may be mixed with the ion exchange resins.

One area of particular application for precoated filters is in the production of electrical power with steam-driven turbines. Such a system includes a steam generator which produces steam to drive a turbine generator. The steam is then condensed and returned to the steam generator for revaporization. The source of heat for the steam generator may be either fossil fuel or nuclear energy.

It is essential that the water recycled through a steam generator be of extreme purity, preferably having dissolved and undissolved solids in the low parts per billion range, the particular purity requirement depending on the type of system employed. In order to maintain these high purity levels, a "condensate polishing" system is conventionally employed to remove impurities from the condensate stream. Precoated filters of the type described above form a particularly suitable apparatus for performing this condensate polishing operation.

Precoated filters also have application in the production of electrical energy in connection with auxiliary systems, for example for the treatment of fuel pool water in nuclear reactors and in the disposal of radioactive wastes.

Particularly suitable methods and apparatus for treating water with a precoat of ion exchange resin particles are described in U.S. Pat. Nos. 3,250,703 and 3,279,608, which are assigned to the assignee of this application. The method of producing the aforementioned "clumping" phenomenon with ion exchange resins is described in U.S. Pat. No. 3,250,702, which is also assigned to the assignee of this application. Additional patents, all of which are assigned to the assignee of this application, and which relate to such condensate polishing systems include U.S. Pat. Nos. 3,250,704; 3,250,705; 3,373,104; 3,377,270; 3,495,807; 3,409,566; 3,615,016; 3,666,097; 3,680,700; and 3,715,033.

Precoated filters are periodically backwashed in order to remove a precoat layer which has become exhausted through the collection of dissolved and/or undissolved impurities. Such removal is usually accomplished long before absolute exhaustion of either the ion exchange or particle absorption ability of the resins. The point at which removal of the precoat is required depends upon whether the undissolved solids capacity or ion exchange capacity is exhausted first. If the undissolved solids capacity is exhausted first (or if dissolved solids removal is relatively unimportant), backwashing is initiated when a predetermined pressure drop is reached. If dissolved solids capacity is exhausted first, backwashing is initiated upon reaching a predetermined conductivity in the effluent. Irrespective of the criterion for terminating the service cycle, the point at which this is accomplished is referred to herein as the "service cycle termination point." The backwash is generally accomplished by the use of both liquid and gas, for example by the method described in U.S. Pat. No. 3,373,104, which is assigned to the assignee of this application.

In order to avoid contamination, it is essential that the backwash liquid be of a high purity level. Heretofore, the backwash liquid has generally been demineralized water provided by external ion exchange systems. The use of such ion exchange systems is expensive, and it is therefore desirable to minimize the amount of water which must be passed through such a system. When a nuclear power plant is involved, it is also important to minimize the delivery of used backwash water to a drain, since such water may contain radioactive impurities, and must therefore be delivered to a suitable disposal facility in order to remove such impurities. In nuclear systems, it is therefore highly desirable to retain this backwash water in the system, not only to minimize demand for additional demineralized water, but also to minimize the need for treatment of radioactive wastes.

In accordance with the present invention, a method is provided for recovering and reusing backwash liquid which has been used to backwash a precoated filter, so that the need for demineralized makeup water and/or for radioactive waste disposal are both minimized. In carrying out the method, the bulk of suspended precoat is removed from the backwash effluent which has been used to remove the precoat in a previous filter backwash cycle, and the effluent is stored. A precoated filter is run to its service cycle termination point, and the stored backwash effluent is passed through the precoated filter to remove impurities. The treated backwash effluent is then used to backwash the filter to remove the precoat. The bulk of suspended solids are removed, and the liquid is again stored for purification and use in a subsequent backwashing cycle as previously described.

The invention, together with the objects and advantages thereof, will be best understood by refrence to the following detailed description, taken in conjunction with the drawing, which is a diagrammatic view of a system designed to carry out the present invention.

Referring to the drawing, an apparatus suitable for carrying out the method of the present invention includes first and second filter units, indicated respectively by reference numerals 10 and 12, which employ a precoat as previously described. As those skilled in the art will appreciate, the present invention is also adapted to use with a system having only one filter unit, or a system having more than two such units. Usually, a condensate polishing system will employ at least two filter units, and sometimes more than two, so that at least one filter unit is on stream while another unit is being backwashed and coated with a fresh layer of precoat. The specific embodiment of the invention described herein is in connection with a condensate polishing system employing two filter units and an ion exchange resin precoat. It will be understood by those skilled in the art that the invention is not limited to such a system, but is applicable to other types of systems and other precoat materials. The filter units 10, 12, are, for example, of the type described in U.S. Pat. No. 3,279,608, although the exact design of the filter unit forms no part of the present invention. Each of the filter units 10, 12 has a service inlet pipe 14 having a valve 16 and a service outlet pipe 18 having a valve 20. During the service cycle, condensate is delivered for polising through the filter units 10, 12 via the service inlet pipes 14 and service outlet pipes 18. The service inlet pipes 14 each communicate with an inlet pipe 22 having a valve 24, while the service outlet pipes 18 communicate with an outlet pipe 26 having a valve 28.

The system shown in the drawing also includes a precoat tank 30 having a mechanical agitator 32 driven by an electric motor 34. Any suitable system may be employed for agitating the precoat and maintaining it in suspension, and the agitator 32 is shown merely by way of example. The precoat tank 30 has an outlet pipe 36 having a pump 38, and communicating with a transfer pipe 40. The precoat tank 30 also has an inlet pipe 42 having a valve 44, and communicating with a transfer pipe 46.

In the lower portion of the drawing, there are illustrated a backwash storage tank 48, a backwash receiving tank 50, and a phase separator 52. The backwash storage tank 48 has an upper inlet pipe 54 having a valve 56, and communicating with the transfer pipe 46. The backwash storage tank 48 also has a lower outlet pipe 58, having a valve 60, which communicates with a vertical transfer pipe 62. The backwash storage tank 48 also has a makeup water inlet pipe 64 communicating with a suitable source of makeup water (not shown) in order to maintain an adequate supply of backwash water.

The backwash receiving tank 50 has a lower outlet pipe 66, having a valve 68, communicating with the vertical transfer pipe 62. The tank 50 also has an upper inlet pipe 70, having a valve 72, also communicating with the vertical transfer pipe 62. Finally, a backwash conduit 74 is shown communicating with the inlet pipes 22 of the filter units 10, 12, and also with an upper portion of the backwash receiving tank 50 via a backwash inlet pipe 76 having a valve 78.

The vertical transfer pipe 62 has a pump 80, which is positioned to deliver liquid from either the outlet pipe 58 in the backwash storage tank 48 or the outlet pipe 66 in the backwash receiving tank 50. This vertical transfer pipe 62 communicates with the transfer pipe 46, and has a valve 82. The vertical transfer pipe 62 also has a backwash delivery pipe 84 communicating therewith between the pump 80 and the valve 82. The backwash delivery pipe 84 communicates with both the inlet pipes 22 to the filter units 10, 12, and has a valve 86 which can control flow to either of these inlet pipes.

Finally, the phase separator 52 provides a phase separation zone, which is used to separate the bulk of the ion exchange resin collected during a backwashing cycle from the backwash liquid. To this end, the phase separator 52 has a lower outlet pipe 90 communicating with the phase separator 52 at a point above the upper level of any ion exchange resin collected in the phase separator 52. The outlet pipe 90 has a valve 92, and communicates with a backwash transfer pipe 94 having a pump 96. The backwash transfer pipe 94 is connected to a lower portion of the backwash receiving tank 50, and has a valve 98 which is located below the junction with the outlet pipe 90. The backwash transfer pipe 94 communicates with an interconnection pipe 100, which interconnects upper portions of the backwash receiver 50 and phase separator 52. The interconnection pipe 100 has a pair of valves 102, 104 located on either side of the juncture with the backwash transfer pipe 94 so that liquid may be delivered through the pipe 94 to either the backwash receiver 50 or the phase separator 52.

Finally, the phase separator 52 has a lower outlet pipe 106 having a valve 108, which may be used to deliver exhausted ion exchange resin from the lower portion of the phase separator to a suitable disposal facility (not shown). When the invention is used in connection with a nuclear power plant, such a disposal facility must be appropriate for disposal of radioactive wastes.

It must be emphasized that the particular apparatus shown in the drawing is merely exemplary of an apparatus that can be employed to carry out the method of the present invention, and that this method could be carried out with significantly different apparatus. It will further be appreciated by those skilled in the art that the location of the various pieces of apparatus and pipes shown in the drawing is purely arbitrary. In fact, in many instances, the phase separator 52, for example, will be isolated and located remotely from the backwash receiver 50, and, in instances where this is not the case, it is even possible to entirely dispense with the backwash receiver 50, since the phase separator 52 can also operate to provide a suitable backwash receiving zone.

In describing the method of the present invention in conjunction with the apparatus illustrated in the drawing, it will be assumed that filter unit 10 has just been shut down for a backwashing cycle, while filter unit 12 is in normal operation. In a typical installation, at the beginning of the service cycle, the ion exchange resin will produce an initial pressure drop of about 3-5 psi at a flow rate of 4 gal./min./ft.$^2$, and the service cycle will be terminated when the pressure drop reaches about 25 psi at the same flow rate. Generally, the particle capacity of the resin will be exhausted before the ion exchange capacity, and continuation of the run beyond a 25 psi pressure drop would cause the precoat particles to become embedded in the filters, so that backwashing would be difficult. In instances where the ion exchange capacity is exhausted before the particle removal capacity, and when it is important to remove dissolved materials from the stream, the service cycle is terminated when a sharp increase in effluent conductivity is noted.

At the termination of the service cycle, all valves are closed with the exception of the inlet and outlet valves 16, 20 associated with the right-hand filter unit 12. At this stage, the backwash receiver 50 contains backwash liquid that has been used in the prior backwash cycle of filter unit 12, which has had the bulk of the solids removed in the phase separator 52, in the manner hereinafter described.

In instances where the ion exchange capacity of the precoat has been exhausted, it is sometimes desirable to provide water that is demineralized for the backwash cycle. To this end, a mixture of regenerated anion and cation exchange resins is added to the backwash liquid contained in the backwash receiver 50 in an amount sufficient to demineralize the liquid. Alternatively, an overlay precoat of fresh resin may be placed on the filters in the filter unit 10 after termination of the service cycle and before initiation of the backwash step. To this end, valves 28, 24, and 44 are opened and pump 38 is started to deliver sufficient precoat from the precoat tank 30 to put a precoat overlay on the exhausted resin in the filter unit 10 in an amount sufficient to demineralize the backwash liquid when it is passed through the filter unit. The pump 38 is then stopped, and valves 24, 28, and 44 are closed.

To initiate the backwashing step, the valves 68, 72 associated respectively with the backwash receiver outlet pipe 66 and backwash receiver inlet pipe 70 are opened, and the pump 80 on the vertical transfer pipe 62 is started. This causes backwash liquid to be recirculated through the backwash receiver 50, so that any solids which were not removed in the phase separator 52 are placed in suspension. In addition, any fresh resin which has been added to demineralize the liquid is also suspended. While this step is being accomplished, a suitable hold pump (not shown) may be utilized to continuously recirculate the liquid contained in the filter unit 10, so that the precoat is maintained on the filters.

After the solids have been suspended in the backwash receiver 50, the valve 72 on the inlet pipe 70 is closed, and the valves 24, 28, 86 and 56, located respectively on the filter unit inlet pipe 22, the filter unit outlet pipe 26, the backwash delivery pipe 84 and the backwash storage tank inlet pipe 54 are opened. This operation permits liquid to be pumped from the backwash receiving tank 50 through the filter unit 10 in the normal flow direction, so that dissolved and undissolved solids are removed in the filter unit 10, and the liquid is then delivered to the backwash storage tank 48 via the transfer pipe 46. If insufficient liquid is available in the backwash storage tank 48, additional makeup liquid may be added at this point via the makeup water inlet pipe 64.

In a condensate polishing system, the precoat will normally reach its service cycle termination point as a result of absorption of suspended solids, so that the pressure drop across the filter reaches its maximum, while the resin retains ion exchange capacity. When this is the case, the liquid from the backwash receiver 50 must be pumped through the precoat at a flow rate below the normal service cycle flow rate. For example, if the service cycle flow rate is a typical 4 gal./min./ft.$^2$, the liquid from the backwash receiver 50 must be passed through the resin at a lower flow rate, say 1 gal./min./ft.$^2$, to avoid exceeding the maximum pressure drop for the filter unit 10. Although such a low flow rate is impractical during the service cycle, it is adequate for treating the relatively small amount of liquid needed for the backwashing step.

After the liquid from the backwash receiver 50 has been passed through the filter unit 10 and delivered to the backwash storage tank 48, the unit is ready for the backwashing cycle. In carrying out this cycle, backwash liquid, which has been purified in the manner just described, is passed through the filter unit 10 in reverse-flow direction. In order to accomplish this, the valves 56, 68, 86 on the backwash storage inlet pipe 54, the backwash receiving tank outlet pipe 66 and the backwash delivery pipe 84, respectively, are closed. At the same time, the valves 60, 82, and 78, located respectively on the backwash storage tank outlet pipe 58, the vertical transfer pipe 62, and the backwash inlet pipe 76 are opened. This operation permits liquid to flow out of a lower portion of the backwash storage tank through the pump 80 and vertical transfer pipe 62 into the transfer pipe 46, and then into the outlet pipe 26 from the filter unit. Since this liquid is flowing into the outlet pipe, it flows in reverse direction through the filter, and removes the precoat. The backwash liquid and suspended precoat then pass out of the filter unit 10 through the outlet pipe 22, into the backwash conduit 74, and then into the backwash receiver 50 through the backwash inlet pipe 76. It will be understood by those skilled in the art that this backwashing step may be accomplished in conjunction with one or more air scour steps, which is well known in the art, and which is described in aforementioned U.S. Pat. No. 3,373,104.

After completion of the backwashing step, all of the backwash liquid and removed precoat will be in the backwash receiver 50. The filter unit 10 is now ready for the application of a new precoat. To this end, valves 60, 82, and 78 are closed, while the valve 44 on the precoat tank inlet pipe 42 is opened and the pump 38 on the precoat tank outlet pipe 36 is started. Liquid containing a fresh, suspended precoat is thus delivered through the filter unit 10 in the normal flow direction, placing a precoat on the surface of the filter for use in the next service cycle. As is well known in the art, recirculation of this precoat suspension through the filter is continued until a sufficient precoat layer is applied. After application of the precoat, the filter unit 10 is ready to be returned to its normal service cycle, which can be accomplished by stopping the precoat pump 38, closing the valve 44 on the precoat tank inlet pipe 42, and by closing the valves 24, 28 located on the filter unit inlet and outlet pipes 22, 26 respectively. The service cycle is then initiated by opening the valves 16, 20 on the service inlet and outlet pipes 14, 18, respectively.

While the precoating step is being accomplished, the backwash liquid and exhausted precoat in the backwash receiver 50 may be transferred to the phase separator 52 by opening the valves 98, 104 on the backwash transfer pipe 94 and the interconnection pipe 100. The pump 96 is started, and the liquid and suspended resin is pumped into the phase separator 52, where it is permitted to remain for a time period sufficient for the bulk of the solids to settle out. The open valves 98, 104, are closed, and the valves 92, 102 on the phase separator outlet pipe 90 and the interconnection pipe 100, respectively, are opened, so that the pump now delivers backwash liquid from a lower portion of the phase separator 52 back into the backwash receiver 50. The solids collected in the lower portion of the phase separator 52 may be removed by opening the valve 108 in the lower outlet pipe 106, and delivered to a suitable disposal facility. It will be seen that, at this stage, the unit is in the same condition as it was at the beginning of the description of the operation, except that the right-hand filter unit 12 is now ready to be taken off stream for backwashing, while the service cycle is handled by the left-hand filter unit 10. As will be appreciated by those skilled in the art, appropriate valving has been provided so that an identical operation may be accomplished in the right-hand unit 12 as was previously described in connection with the left-hand unit 10, so that such a description need not be undertaken.

The following examples are intended to illustrate the present invention, and should not be construed as limitative, the scope of the invention being determined by the appended claims.

EXAMPLE I

A system similar to that shown in the drawing was used to treat a condensate stream in a nuclear power plant. Each filter unit had replaceable tubular nylon-wound filter elements of the type shown and described in U.S. Pat. No. 3,279,608, having a total of 1500 ft.$^2$ of filter surface area. The filter cartridges were precoated with a mixture of anion and cation exhange resin particles in the size range of 60–400 mesh. The cation exchange resin was a commercially available, strong-acid resin in the hydrogen form, and the anion exchange resin was a commercially available strong-base resin in the hydroxide form. The resins were coated on the filter elements to a depth of about ¼ in.

The service cycle flow rate was maintained at 4 gal./min./ft.$^2$ of filter area, and the initial pressure drop was about 2–3 psi across the elements. The service cycle was continued until the pressure drop reached 25 psi, while the effluent conductivity was less than 0.1 micromho.

The backwashing cycle was initiated by recirculating 15,000 gallons of used backwash water from a previous backwashing cycle in a backwash receiving tank, so that any particles were suspended. The backwash liquid was then delivered through the filter unit at a flow rate of 1 gal./min./ft.$^2$, producing a pressure drop of about 7 psi. The effluent was a clear stream of demineralized water, which was delivered to a backwash storage tank. 100 gallons of demineralized water were added to the tank to produce a total volume of about 15,100 gallons of backwash water. The backwash liquid was then delivered through the filter elements in reverse-flow direction at a flow rate of 1 to 1.5 gal./min./ft.$^2$. Air was also passed through the filter elements at a rate of 1 to 1.5 standard ft.$^3$/min./ft.$^2$ to air-scour the filter elements and to aid in removing precoat. This combination of backwash liquid and air scouring is well known in the art, and is described in U.S. Pat. No. 3,666,097, which is assigned to the assignee of this application.

The backwash water and suspended precoat was delivered to a phase separator, where it was retained for one hour to permit the solids to settle, and was then transferred to a backwash receiving tank for use in a subsequent backwashing cycle, as hereinbefore described. The filter elements are then coated with a fresh layer of precoat and returned to the service cycle.

EXAMPLE II

Example I was repeated, except that the service cycle was terminated when the pressure drop across the resin is only 20 psi. The cycle was terminated because the effluent conductivity rose above 0.1 micromho, indicating that the ion exchange capacity was exhausted.

Because the precoat had exhausted its ion exchange capacity, 5 pounds of resin precoat were added directly to the backwash liquid in the backwash receiving tank to demineralize the water. The backwash water was then passed through the resin as in Example I. The filtered water was delivered to the backwash storage tank and was used to backwash the resin as in Example I. The filter was recoated and returned to service as in the preceding paragraph.

Obviously, many modifications and variations of the invention as hereinbefore set forth will occur to those skilled in the art, and it is intended to cover in the appended claims all such modifications and variations as fall within the true spirit and scope of the invention.

I claim:

1. A method for recovering and reusing backwash liquid contaminated with dissolved and undissolved impurities and which is used to backwash a filter at the end of a service cycle, said filter being precoated with ion exchange resin particles in the size range of 60–400 mesh, comprising:

separating a major first portion of the undissolved impurities from a backwash liquid that has been used to backwash a filter in a previous backwash cycle so that a smaller second portion of the undissolved impurities remains with said liquid;

placing the remaining second portion of said undissolved impurities in suspension in said liquid from which the major first portion of the undissolved impurities has been separated;

delivering said liquid containing the remaining second portion of said undissolved impurities which has been placed in suspension through said precoated filter at the end of a service cycle of said precoated filter to remove said dissolved impurities and the remaining second portion of said undissolved impurities;

backwashing said filter with said liquid from which dissolved and undissolved impurities have been removed; and storing said liquid for use in a later backwash operation.

2. The method as defined in claim 1 wherein said liquid is delivered through said precoated filter at a flow rate below the service cycle flow rate.

3. The method as defined in claim 1 wherein fresh ion exchange resin particles are added to said backwash liquid prior to delivering said liquid through said filter.

4. The method as defined in claim 1 wherein said precoated filter is precoated with an overlay of fresh ion exchange resin prior to delivering said liquid through said filter to remove said impurities.

5. The method as defined in claim 1 wherein said major portion of undissolved impurities are separated in a phase separation zone, and wherein said liquid is then delivered to a backwash receiving zone isolated from said phase separation zone.

6. In a filter system having first and second filters for alternate use in a service cycle, a method for recovering and reusing backwash water contaminated with dissolved and undissolved impurities, said first and second filters having a precoat of ion exchange resin particles in the size range of 60–400 mesh, comprising: backwashing said first precoated filter by delivering water from a backwash storage zone to said first precoated filter to remove said precoat; delivering said backwash water from said first precoated filter to a phase separation zone and separating suspended solids from said water in said zone; delivering said water from said phase separation zone to a backwash receiving zone isolated from said phase separation zone; delivering said water from said backwash receiving zone through a second precoated filter after the end of the service cycle for said second precoated filter, whereby to remove dissolved and undissolved solids from said water; and delivering said water to said backwash storage zone.

7. The method as defined in claim 6 wherein fresh ion exchange resin particles are added to said water in said backwash receiving zone to demineralize said water.

8. The method as defined in claim 6 wherein said second precoated filter is precoated with an overlay of fresh ion exchange resin prior to delivering said water from said backwash receiving zone through said second filter.

9. The method as defined in claim 8 wherein said water from said backwash receiving zone is delivered through said second filter at a rate below the service cycle flow rate.

* * * * *